Nov. 25, 1947.    A. M. STARR    2,431,516
ENGINE CONTROLLER
Filed Jan. 9, 1945    3 Sheets-Sheet 2

INVENTOR.
ALLAN M. STARR
BY Ernest Sweetland
ATTORNEY.

Nov. 25, 1947.   A. M. STARR   2,431,516
ENGINE CONTROLLER
Filed Jan. 9, 1945   3 Sheets-Sheet 3
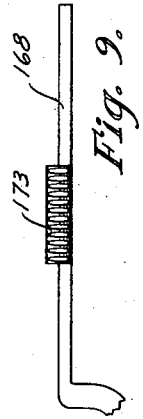
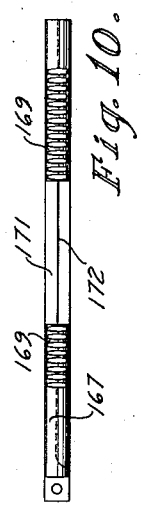
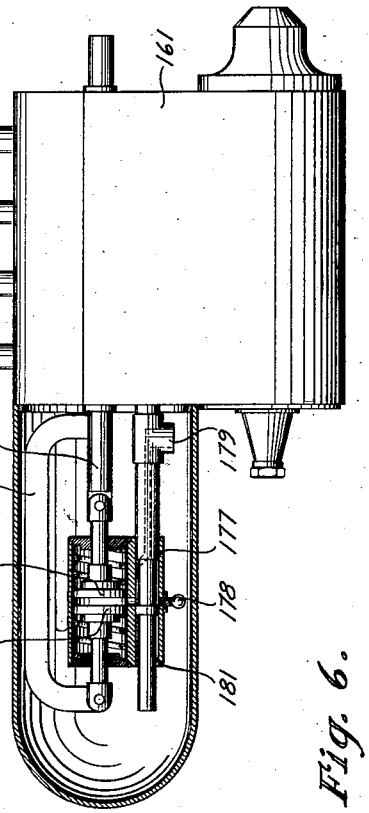
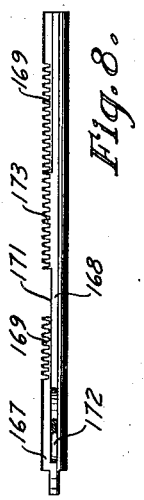
INVENTOR.
ALLAN M. STARR
BY Ernest A. Sweetland
ATTORNEY.

Patented Nov. 25, 1947

2,431,516

UNITED STATES PATENT OFFICE 2,431,516

ENGINE CONTROLLER

Allan M. Starr, Piedmont, Calif., assignor to Starr and Sweetland, a copartnership Application January 9, 1945, Serial No. 572,067

11 Claims. (Cl. 123—52)

My invention relates to means for controlling the operation of prime movers, more especially internal combustion engines, and particularly engines employing fuel injection devices, especially those with spark ignition. It is customary to operate internal combustion engines under varying loads and at varying speeds, usually under manual control or under manually supervised governor control. The operation of such an engine at moderate and full loads does not ordinarily introduce any serious problems, but the operation at small and light loads often introduces a problem of controlling suitably the introduction of fuel. This problem becomes especially aggravated in the case of relatively small engines and particularly in those having a multiplicity of cylinders so that the load per cylinder is quite small. Difficulty arises in that it is hard to atomize a very small fuel charge into sufficiently minute portions to have the right relationship or proportion to the combustion air and to be appropriately distributed throughout the combustion air for ready ignition. A minimum requirement is that the ignition take place and continue rather uniformly throughout the fuel air mixture, and this is impossible of achievement with any degree of reproducibility when the fuel amount is exceedingly small. In spark ignition engines it is, furthermore, difficult to provide a mixture rich enough for ignition in the vicinity of the spark plug when the fuel quantity is minute. In addition, injection engines are normally designed so that they are most efficient at relatively heavy and moderate loads, the resulting efficiency at light and idling loads being relatively poor. Thus, an engine operating at light loads consumes a proportionately excessive amount of fuel. All of these effects are cumulative at light loads, that is, the difficulties of metering, atomizing and distributing the fuel are increasingly great, so that at light loads engines which otherwise are suitable and satisfactory operate erratically and abnormally.

It is, therefore, an object of my invention to provide an engine controller effective to maintain and improve operating conditions during light-load engine operation.

Another object of my invention is to provide means for shifting the load from all of the cylinders of a multicylinder engine onto less than all of the cylinders under light-load conditions.

An additional object of my invention is to provide a means for shifting the engine load from one group of cylinders to another group without appreciable change in the torque delivered by the engine.

A further object of my invention is to provide means for supplying fuel alternatively to some or all of the cylinders of a multicylinder engine, depending upon the engine load.

An additional object of my invention is to provide means responsive to the amount of load upon the engine for automatically supplying fuel to some only of the engine cylinders.

An additional object of my invention is to provide a fuel supplying system quickly responsive to changed operating conditions for distributing fuel to the engine cylinders automatically in either of two ways.

A further object of my invention is to increase relatively the fuel supplied to the cylinders still operating when some of the cylinders are out of operation.

A still further object of my invention is in general to improve the light-load operation of multicylinder engines.

Other objects of my invention, together with the foregoing, will be set forth in the following description of the preferred embodiments of the invention, illustrated in the accompanying drawings in which Figure 1 is a diagrammatic side elevation of a portion of a multicylinder injection-type engine with one embodiment of my invention incorporated therewith.

Figure 6 is a side elevation of a modified portion of a controlling structure according to my invention, a portion of the structure being disclosed in cross section on a generally vertical, longitudinal plane.

Figure 7 is a side elevation of a composite rack structure utilized with the invention embodiment disclosed in Figure 6.

Figure 8 is a plan of the composite rack structure utilized with the invention embodiment shown in Figure 6.

Figure 9 is a side elevation of one of the racks of Figure 7, illustrated alone.

Figure 10 is a side elevation of the other of the racks of Figure 7, illustrated alone.

Figure 1:
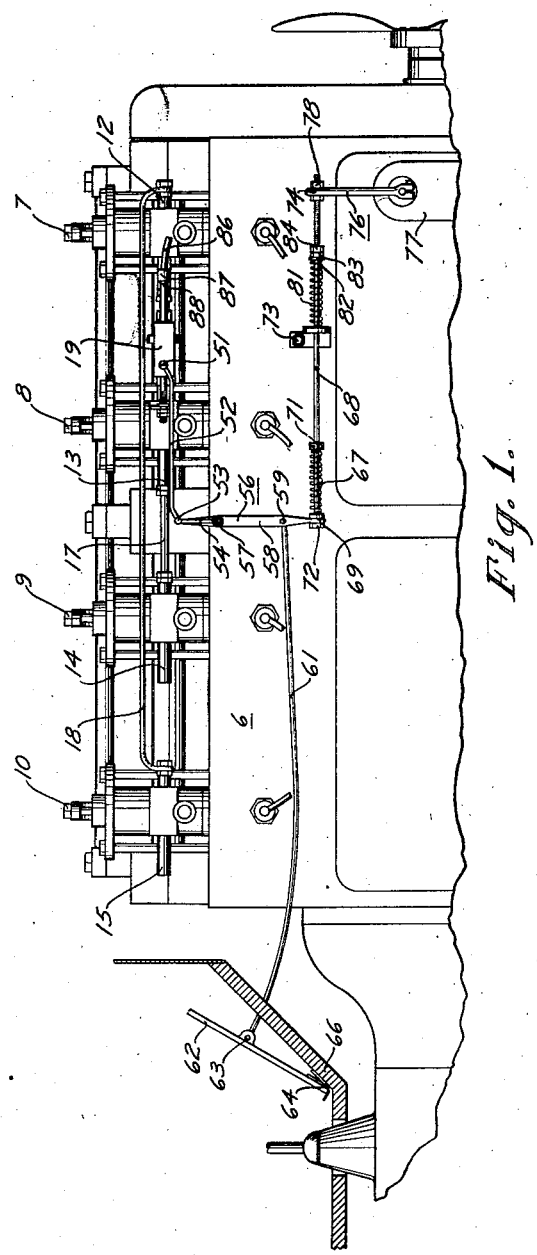

In its preferred form my invention is for use with an engine of the multicylinder type having a plurality of fuel controllers, preferably one for each cylinder and customarily in the nature of fuel injectors, each being variable to control the flow of fuel to its respective cylinder. The various fuel controllers or injectors are divided into a first group and into a second group. The controllers of the first group are joined to a responsive element such as a piston, while the controllers of the second group are similarly joined to a responsive element such as a second piston. The pistons are movable within a cylinder defined by a housing and are normally urged into a first or approached position within the cylinder by suitable means, such as springs. In addition, there is provided means for overcoming the urgency of the springs and for forcing the pistons into a different relative or spaced-apart position. The housing itself is mounted for movement wth respect to its support, usually on the engine, and means are provided responsive to such movement of the housing for governing a flow of pressure fluid to the cylinder for changing the relative position of the pistons. Under medium and full loads the supply of actuating fluid to the cylinder is cut off and the springs hold the pistons relatively close together and in effect as a unit with the housing. When the housing is moved under these conditions all of the fuel controllers on the engine are uniformly and simultaneously varied. When the load on the engine is relatively light and the housing is moved into light-load position operating fluid is admitted to the cylinder, quickly forcing the pistons apart concurrently and substantially equivalent amounts against the urgency of the springs and holding them apart during light-load motion of the housing. In response to the movement of the housing into light-load position the piston controlling one group of fuel injectors varies such injectors to interrupt completely the supply by them of fuel to the engine; whereas the piston controlling the fuel injectors in the second group is moved into a position comparably increasing the amount of fuel supplied by its injectors to the engine. Thus, as the engine load changes from moderate to light some of the cylinders are prevented from operating and the remaining ones are given more fuel to assume the transferred load. In going from light load to moderate load on the engine as a whole the load on some of the cylinders is relatively reduced, while simultaneously that proportion is imposed upon the remaining cylinders. In the light-load range, however, the controller varies the fuel injectors of the still operating cylinders as usual, and in the moderate or heavy-load range the controller varies the amount of fuel injected by all of the injectors into all of the cylinders in the usual fashion. Consequently, with this arrangement, under full-load conditions or heavy-load conditions the operation of the engine is exactly as normal or customary, yet in the light-load position the operation of the engine, though variable, is upon less than the full number of cylinders. This means that at light and idling loads the efficiency of the actual operating cylinders is higher than it otherwise would be. The amount of fuel supplied to them is sufficient to provide a good mixture for ignition and burning.

It is feasible to embody the invention to utilize a fluid, such as oil under pressure, as the actuating medium for producing a quick or snap controlling action therewith, and it is also satisfactory to utilize electrical means for the purpose. There is substantially no difference in operating characteristics between the hydraulic fluid operated mechanism and the electrically operated mechanism; hence, except where the following description especially differentiates, the generally descriptive language applies to both of these forms of the invention.

In the form particularly shown in Figures 1 to 4, there is provided a multicylinder engine 6. The engine is of any conventional kind including a plurality of multiplicity of cylinders, each provided with a suitable fuel controlling mechanism. For purposes of illustration this might be shown as a throttle on a fuel supplying structure, but in the present instance there is illustrated a four-cylinder engine, each cylinder having an individual one of several fuel injectors 7, 8, 9, and 10, respectively. Each of the injectors is connected in a well-known fashion so as to receive fuel from a source of supply, not shown, and is driven in timed relation to the operation of the engine to inject fuel into the appropriate cylinder. In this instance each of the injectors is identical with the others and is provided with means for varying the quantity of fuel supplied through it to its respective cylinder from a maximum amount down to a minimum so low as to constitute a cutoff or no-flow condition. For the purpose of varying the amount of fuel flow through it, each injector is provided with a translatable rod 12 connected in a well-known manner, as by a rack and gear structure, not shown, to mechanism for varying the quantity handled. A similar rack rod 13 is provided in connection with the injector 8, a comparable rack rod 14 is provided for the injector 9, and a rack rod 15 is included with the injector 10. In the usual engine all of the rack rods 12, 13, 14 and 15 are connected together for operation in unison.

In accordance with my invention and in the present instance the rack rods are not all permanently connected for operation in unison but are connected for operation in a predetermined or selected number of groups. For example, in the present case I prefer to connect the rack rods 13 and 14 together to form a first group controlling cylinders 2 and 3 of the engine and, comparably, to connect together the rack rods 12 and 15 for concurrently controlling the operation of cylinders 1 and 4 of the engine. The connection between the rack rods 13 and 14 to tie them into the first group is effectuated by a connecting link 17 and, similarly, the junction between the rack rods 12 and 15 to tie them into the second group is accomplished by a connecting link 18, appropriately fastened to the respective rods 12 and 15. With this arrangement any motion of the rack rod 13 is correspondingly imparted to the rack rod 14 and any motion of the rack rod 12 is imparted to the rack rod 15.

In accordance with my invention, means are provided to be effective upon the rods 12 and 13 and thus upon the two groups of fuel controllers to move them all in unison under conditions of moderate and full-load operation, and to move the groups individually or in unison under different relative relationship under conditions of light-load operation. For this reason the rack rods 12 and 13 are extended in axial alignment but are spaced apart to accommodate an interposed housing 19, formed to provide an interior cylinder 21. Disposed within the cylinder is a pair of pistons. A piston 22 is provided with a stem 23 passing through an apertured head 24 closing one end of the cylinder 21 and terminating in a button 26, transversely slidable into a receiving socket 27 cut in the head of an adjusting stud 28. This stud is threaded into the tapped end of the rack rod 12 and is locked in any axially adjusted position by a nut 29.

With this construction the piston 22 is united to the rod 12 for concurrent axial translation, but for assembly and disassembly the piston is transversely detachable from its connection with the rod 12. By means of the adjustment the relative axial position of the piston 22 and the end of the rod 12 can be readily set as desired.

The piston 22 is movable axially within the cylinder 21, being limited in such motion by an internal stop 31 integrally formed with the stem 23 and by an external collar 32, in one position abutting the head 24. A helical spring 33 abuts the piston and the cylinder head 24 and is effective to urge the piston and its attached mechanism toward the left in Figure 2, or in a direction so that the collar 32 abuts the cylinder head 24.

In a somewhat similar fashion, a second piston 36 is translatable within the cylinder 21 against the urgency of a helical spring 37 interposed between the piston and the cylinder end wall 38. A stop 39 integral with the piston stem 41 limits the compression of the spring 37 and the motion of the piston toward the left in Figure 2. The piston stem passes through the apertured end of the cylinder wall 38 and is threaded to engage the tapped end of the rack rod 13. Because of this threaded engagement the relative axial position of the piston stem 41 and of the rack rod 13 can be set as desired and locked in position by a lock nut 42.

Figure 2:
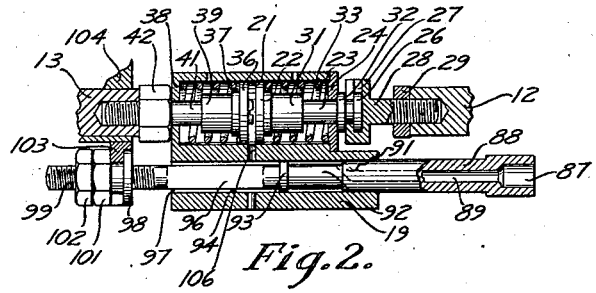
Figure 2 is a cross section, on a generally vertical, longitudinal plane, with portions broken away, of a fluid-actuated controller constructed in accordance with my invention.

With the arrangement as so far described, the springs 33 and 37 are sufficiently unyielding with respect to the resistance to motion of the rack rods 12 and 13 so that the pistons 22 and 36 are urged to approach each other with the collar 32 abutting the housing 19 and the lock nut 42 also abutting the housing and in effect forming a solid connection between the rack rods 12 and 13 and the housing 19. Thus, as the housing 19 is moved in an axial direction either to the right or to the left, as seen in Figure 2, the force of the springs is sufficient to cause the rack rods 12 and 13 to move in unison therewith and to control the injectors of both groups and the cylinders of the entire engine in a uniform fashion.

Advantage is taken of this relationship to control the engine under normal conditions of moderate and full load by coupling the housing 19 into the operator's control system. For that reason the housing 19 is provided with a removable connection 51 to an actuating rod 52 connected by a pivot pin 53 to the upper arm 54 of a rocking lever generally designated 56. A fulcrum pivot 57 effectuates a mounting for the rocking lever 56 on the engine 6. The rocking lever incorporates a lower arm 58 connected by a pivot pin 59 to a manual or supervisory control rod 61 extending to a control lever 62 and fastened thereto by a pivot pin 63. The lever 62 is either manually or pedally operated or is otherwise under the control of an operator. In the present instance it takes the form of a foot treadle mounted by a fulcrum pin 64 on a suitable part of the supporting mechanism 66 to which the engine 6 is related. With this motion train a depression of the treadle 62 or a fuel-increasing rotation thereof in a clockwise direction, as seen in Figure 1, is effective to produce a corresponding shift of the rod 61, a rocking of the lever 56 in a counterclockwise direction, and a translation of the housing 19 to the left, as seen in Figures 1 and 2 and, consequently, a translation of all of the rack rods 12, 13, 14 and 15 in the same direction.

Restoring movement of the controlling linkage, with motion in the reverse sense from heavy-load toward light-load position, is effectuated by a relatively light coil spring 67 surrounding a governor rod 68 passing through the pierced lower end 69 of the rocker 56. The spring 67 not only overlies or encompasses the rod 68 in abutment with the end of the rocker 56, but as well abuts a stop collar 71 locked on the governor rod. The amount of motion between the rod 68 and the lower end 69 of the rocker is in one direction limited by a stop head 72 formed on the rod 68. With this arrangement and considering the rod 68 as a stationary portion of the mechanism, the spring 67 is normally effective to urge the treadle 62 into light-load or no-load position and to urge the housing 19 and its appurtenant structures to the right in Figures 1 and 2 into light or no-load position. The force imposed by the spring 67, however, is readily overcome upon manual depression of the treadle 62.

Since it is desired that the engine 6 be regulated not only manually but also by an automatic mechanism, yet with the manual control taking precedence, I provide that the rod 68 pass through a mounting bracket 73 on the engine and extend to the pierced upper end 74 of the operating arm 76 of a governor 77 of conventional type and operated by the engine 6 in accordance with some main function thereof, such as engine speed. The arrangement of the governor is such that when the engine speed is deficient and is to be increased the arm 76 rotates in a clockwise direction, as seen in Figure 1, and because of an abutment 78 at the end of the rod 68 draws the rod to the right, as seen in Figure 1, so that the head 72 abuts the end 69 and correspondingly rotates the rocker lever 56 in a counter-clockwise direction, just as though it had been so rotated by pressure on the treadle 62.

To urge the governor rod 68 in the reverse direction when the engine speed is excessive and the arm 76 returns in a counter-clockwise direction, a light coil spring 81 is positioned around the rod 68 to abut the bracket 73 and also to press against a collar 82 adjustably positioned firmly upon the rod 68 by a pair of jam nuts 83 and 84, respectively. With this arrangement the speed of the engine and its ability to carry load can always be increased manually by operation of the treadle 62, despite any operation of the governor. Also, if the treadle is at any time held in a position below the minimum governed speed of the engine the governer is effective to move the linkage in a direction to increase the load-carrying capability of the engine. With this mechanism there is provided a means for controlling all of the fuel supplying structures of the engine in unison by an automatic governor subject to manual override but capable of establishing a minimum load or speed operation.

As so far described and without more, the mechanism is effective to control completely the operation of the engine in the customary or usual manner, all portions thereof being equivalently and simultaneously regulated. In accordance with my invention, there is provided a means for regulating different portions of the engine in different ways. For this purpose the housing 19 is provided with a connection to a source of fluid under pressure, for example a hydraulic fluid, such as oil. Conveniently, the oil under pressure is taken from the customary lubricating oil pressure system normally incorporated with the engine 6. Oil from this source is led through a suitable conduit 86 having a junction 87 with a valve rod 88 bored out centrally to afford a passage 89 leading from the oil supply conduit to a bias passage 91 establishing communication with a cut-away or relieved valve portion 92. The portion 92 is defined or delimited by the adjacent full diameter portion of the rod 88 and also by a collar 93 or land of full diameter, slidable with minimum clearance within a cylindrical valve bore 94 conveniently formed in the housing 19.

Also occupying part of the bore 94 and formed as an extension of the tube 88 is a stem 96, of lesser cross-sectional area than the bore 94, to afford a drain passage 97. The stem 96 is stationarily secured to any suitable fixed portion of the engine and in the present instance is provided with an enlarged collar 98 mounted upon a threaded terminus 99 of the stem 96 and locked in position by a pair of jam nuts 101 and 102, respectively. Axially confined but laterally movable with respect to the stem 96 is a mounting bracket 103 transversely slotted and extending from the casing 104 of the injector 9. With this arrangement, when the jam nuts 101 and 102 are loosened the housing 19 and its appurtenances are transversely removable from the mounting. When the housing is in position with the jam nuts 101 and 102 tightened, the stem 96 is firmly held against any motion whatsoever.

Since the stem is fixedly mounted and the housing 19 is movable, advantage is taken of the relative motion to control the flow of pressure fluid from the supply tube 86 to the chamber 21. This is accomplished by the provision of a valve aperture 106 establishing communication between the bore 94 and the cylinder 21. The aperture is bored through the housing 19 and then has the exterior portion plugged. In the relative position of parts illustrated in Figure 2, which is the full-load operating position, the oil under pressure from the conduit 86 cannot pass the land 93 of the valve except in leakage quantities that are immediately discharged through the drain passage 97.

Figure 3:
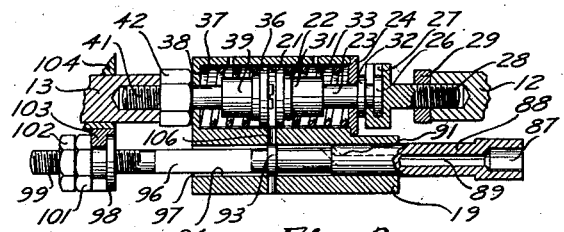
Figure 3 is a view similar to Figure 2, but showing the parts in a different position.

When, however, the structure of the housing 19 is moved toward a lighter load position and into the position shown in Figure 3, the aperture 106 is in precise alignment with the land 93. This is a marginal or border position. During this motion the housing 19 has moved the rack rods 12 and 13 in unison to produce a uniform reduction in load-carrying capacity of the engine by uniformly reducing the fuel supplied to all the cylinders. Slight further motion of the housing 19 in a load-reducing direction causes the port 106 to override the land 93 and to come into communication with the chamber around the reduced portion 92 of the stem so that fluid under pressure flows freely through the connection 87, through the bore 89, through the bias passage 91, and through the port 106 into the cylinder 21 between the two pistons 22 and 36.

Figure 4:
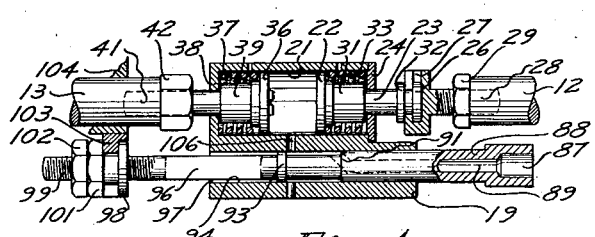
Figure 4 is a view similar to Figures 2 and 3, but showing the parts in another position.

The pressure exerted by the admitted fluid is much greater than any resistance imposed by the equivalent springs 33 and 37 and consequently both of the pistons 22 and 36 are immediately and quickly forced apart equivalently into remote positions relative to each other in opposite ends of the cylinder 21, compressing the springs to a maximum amount and until the stop 31 abuts the cylinder head 24 and simultaneously the stop 39 abuts the cylinder end 38. This position is illustrated in Figure 4 and shows that when the pistons are slid apart under the urgency of the liquid pressure they form a substantially rigid unit with the housing 19 so that they again move in unison therewith.

The effect of spreading the pistons apart is to translate the rack rod 12 and all of the mechanism associated therewith, specifically the rack rod 15, farther than usual toward the right, as seen in these various figures of the drawings, which is in the fuel-reducing direction, so that the injectors 7 and 10 by this motion are abruptly put into inoperative condition, or so that they introduce no fuel into cylinders 1 and 4. To make sure there is no fuel injection there may be a slight overtravel of the injectors 7 and 10 in the "off" direction. In this way, a group of the cylinders, in this instance half of them, is put out of operation and does not bear any part of the engine load.

To assume the load removed from cylinders 1 and 4, cylinders 2 and 3 are given additional fuel in a proportionate amount by reason of the translation of the rack rod 13 to the left, as seen in the various figures, by an equivalent amount. Thus, when the structure is in the position shown in Figure 3 the load is evenly distributed and carried by all four of the cylinders, whereas with the change in position as illustrated in Figure 4, fuel has been cut off from cylinders 1 and 4 but an equivalent additional amount has been directed to cylinders 2 and 3. Because of the operation of the pressure fluid or "servo" mechanism this change is made quickly and in effect virtually within an engine cycle, so that no misfiring or smoking occurs.

After the pistons have been forcibly urged to occupy the ends of the cylinder 21 in the housing, additional load-reducing motion of the housing carries both of the rack rods 12 and 13 uniformly therewith, thereby reducing the amount of fuel supplied to cylinders 2 and 3 and moving the injector controllers for cylinders 1 and 4 in the same reducing direction, but since these injectors are already in a no-fuel position there is simply a mechanical overtravel or lost motion therein. The load can be reduced as much as desired by continued motion of the linkage in the same direction. The engine is still uniformly under the operator's control and under governor control whether it is operating on one group of cylinders or several groups of cylinders. The changeover and redistribution of load carried by the cylinders occurs so quickly and with such a balanced redistribution of load that there is no perceptible variation in engine performance, except audible indications of changed explosion frequency.

When the load is again increased by appropriate motion of the treadle 62, the housing 19 is again translated toward the left, as seen in Figure 1, and reversely travels from its Figure 4 position through its Figure 3 position and back into an approximation of its Figure 2 position. After the part 106 travels over the land 93, it is isolated from the chamber 92, and is in communication with the passage 97, so that the cylinder oil is free to discharge. Under this condition, the springs 33 and 37 are effective quickly to snap the pistons 22 and 36 from their remote relative position within the cylinder 21 into their approached position in that cylinder, discharging the previously confined oil. This restores the mechanism into its Figure 2 position with the rack rods 12 and 13 again in approached position and all cylinders of all groups firing under equivalent loads and under the general, uniform control of the treadle. In this way, by continuous motions of the treadle the load is carried by some or all of the cylinders of the engine, with the transfer being effectuated smoothly and quickly in either direction.

Figure 5:
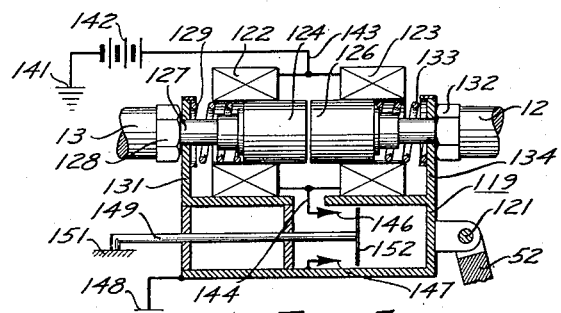
Figure 5 is a view largely in section on a longitudinal, vertical plane, with parts broken away and portions shown diagrammatically, of an electrically actuated controller constructed in accordance with my invention.

In accordance with my invention, a servo mechanism other than one hydraulically actuated can readily be employed. For example, an electrical mechanism may be utilized, as illustrated in Figure 5, wherein the structure generally is like that previously described except that the housing 119, although connected by a fastening 121 to the control rod 52 as before, serves as a mounting for a pair of magnetic or solenoid coils 122 and 123. These coils are coaxially arranged and encompass a pair of solenoid cores 124 and 126, respectively. The core 124 is mounted by a stem 127 on the rack rod 13, being held in adjusted position by a jam nut 128 and being urged toward the central position with respect to the housing 119 by a coil spring 129 interposed between the core 124 and an upstanding ear 131 included in the housing. In a similar fashion, the core 126 is mounted on the rack rod 12, being held by a jam nut 132 and being urged toward an approached position with the core 124 by a coil spring 133 interposed between the core 126 and an apertured ear 134 included in and upstanding from the housing 119.

With this arrangement, operation of the control rod 52 translates the housing 119 in either direction and, due to the pressure of the springs 129 and 133, moves the cores 124 and 126 and the rack rods 12 and 13 in unison. To provide the snap spreading action of the cores 124 and 126, the coils 122 and 123 are connected in parallel in an electrical circuit. This circuit extends from a ground connection 141 of a source of power such as a storage battery 142 through a conductor 143 to each of the coils 122 and 123 in parallel and from them in parallel to a conductor 144 joined to a resilient switch contact 146, diagrammatically illustrated. A similar resilient switch contact 147 is connected to the housing 119, in turn maintained at ground potential by a ground connection 148. In order to close the switch and energize the coils at an appropriate point in the travels of the housing, a stem 149 is suitably mounted on any stationary portion 151 of the engine structure, extends into the housing 119 and carries a switch contact plate 152 in an appropriate location.

In the large load positions of the housing 119 the switch contacts 146 and 147 are out of abutment with the plate 152 and the circuit through the coils 122 and 123 is open, affording unhampered mechanical translation of the elements. When the housing 119 is moved into a critical small-load position both of the switch contacts 146 and 147 abut the conducting plate 152 so that an electrical circuit is completed through the coils 122 and 123. This occurs instantly, instantly energizing the two cores 124 and 126 into their respective coils 122 and 123 against the urgency of their respective springs 129 and 133, thus abruptly snapping the rack rods 12 and 13 apart to produce the same effect as produced by the hydraulic servo mechanism. Further motion of the housing towards lower load position or smaller load position merely deforms the resilient contact points 146 and 147 without interrupting the circuit.

Upon reverse or return motion toward full-load position of the housing, the contacts 146 and 147 return to their extended positions and finally leave contact with the conducting plate 152, instantly breaking the continuity of the electrical circuit, thus de-energizing the coils 122 and 123, permitting the springs 129 and 133 to snap the cores 124 and 126 from their remote position within the housing 119 back to their approached or adjacent position within such housing. In this fashion there is afforded an electrically energized structure producing the same mode of operation and the same fuction as the hydraulically energized device.

In some engine installations the various fuel controlling devices, such as injectors, are not individually installed at each cylinder, as illustrated in Figure 1, but rather are grouped into a pump unit, as illustrated in Figure 6. The engine controller of my invention is readily incorporated with fuel control devices of this nature and, for the most part, is unchanged from the devices already considered, although some installation variations are included. As disclosed in Figures 6 to 10, inclusive, the pump unit 161 includes a plurality of pumps 162, 163, 164, and 165, these being identical units and arranged in a first group including injector pumps 162 and 165 and a second group including injector pumps 163 and 164. The pumps of the first group are controlled by a rack rod 167, while those of the second group are controlled by a rack rod 168. These rack rods are movable in unison and also are formed to be movable with respect to or relative to each other. The rack rod 167 is provided with rack teeth 169 at either side of an interrupted portion 171 and is likewise formed with a longitudinal groove 172. Within the groove 172 is slidably disposed the rack rod 168 and rack teeth 173 formed thereon, operating within the relieved portion 171. The rack rods 167 and 168 extend to pistons 174 and 176, arranged precisely like the pistons 22 and 36, and operating within a housing 177 identical with the housing 19. The housing 177 is provided with a connector 178 joining it to the controlling rod 52 so that the operation of the housing is identical with that shown in Figures 2, 3 and 4. Further, there is a hydraulic fluid supply line at 179 and a spill passage 181 for discharged operating oil. With this arrangement the function of the operating mechanism is identical with that previously described, yet the installation is appropriate to a plurality of pumps arranged in a common housing 161.

With all forms of my invention there is afforded a mechanism for redistributing the load among the engine cylinders in accordance with the total amount of the load upon the engine, one which does so quickly and with proper apportionment, yet one which does not in any wise add to the complexity of the control, but rather is under the same controlling instrumentalities that are customarily provided. Thus, it is feasible to operate less than all of the cylinders of the engine under light-load conditions with better efficiency and with better fuel distribution than customary.

What is claimed is:

1. An engine controller for an engine having a pair of fuel suppliers comprising a control element movable within and between a first range and a second range, means operated by said control element for regulating both of said fuel suppliers in unison in the same direction when said element is in said first range, and means operated by said control element for regulating but one of said fuel suppliers in said direction and the other of said fuel suppliers in the opposite direction when said element is in said second range.

2. An engine controller for a plurality of variable fuel injectors comprising means effective when moved through one range to vary all of said injectors in one sense simultaneously and when moved through a further range to vary only some of said injectors in said one sense and the remainder of said injectors in the opposite sense.

3. An engine controller for a plurality of fuel injectors comprising a control element, means for connecting said control element to one of said injectors with a lost-motion connection, means for connecting said control element to another of said injectors with a lost-motion connection, and means for simultaneously taking up the lost motion in said lost-motion connections.

4. An engine controller for a plurality of fuel injectors comprising a control element, means for connecting said control element to one of said injectors with a lost-motion connection, means for connecting said control element to another of said injectors with a lost-motion connection, and means effective in a predetermined position of said control element for taking up the lost motion in said lost-motion connections.

5. An engine controller for a plurality of fuel injectors comprising a control element, means for connecting said control element to one of said injectors with a lost-motion connection, means for connecting said control element to another of said injectors with a lost-motion connection, and means effective upon relatively slow motion of said control element for relatively quickly taking up the lost motion in said lost-motion connections.

6. An engine controller for a plurality of variable fuel injectors on an engine comprising a housing formed to provide a cylinder, a first piston in said cylinder connected to vary one of said fuel injectors, a second piston in said cylinder connected to vary another of said fuel injectors, means for urging said pistons into one position relative to each other within said cylinder, means for forcing said pistons into another position relative to each other within said cylinder, and means dependent upon motion relative to said housing for controlling said forcing means.

7. An engine controller for a plurality of variable fuel injectors on an engine comprising a housing formed to provide a cylinder and movable with respect to said engine, a first piston in said cylinder connected to vary one of said injectors, a second piston in said cylinder connected to vary another of said fuel injectors, means for urging said pistons toward each other, means for forcing said pistons away from each other, and means dependent upon the position of said housing with respect to said engine for controlling the relative effectiveness of said urging means and said forcing means.

8. An engine controller for a plurality of variable fuel suppliers on an engine comprising a housing movable on said engine and formed to provide a cylinder, a first piston in said cylinder effective to control one of said suppliers, a second piston in said cylinder effective to control another of said suppliers, springs for urging said pistons together, fluid means for forcing said pistons apart, and a valve operated in response to relative movement between said housing and said engine for controlling the effectiveness of said fluid means.

9. An engine controller for a plurality of variable fuel injectors comprising means effective in one range of movement to vary all of said injectors substantially identically, and means effective in another range of movement to vary one of said injectors a predetermined amount in one direction and simultaneously to vary another injector substantially said amount in the opposite direction.

10. An engine controller for a plurality of variable fuel injectors comprising means for varying a first group of said injectors in accordance with the engine load throughout a light load range, and means effective at a predetermined engine load for varying the injectors of said first group and of a second group to distribute the engine load over all of the injectors of both of said groups.

11. An engine controller for a plurality of fuel injectors comprising a control element movable with respect to an engine, a first injector controller connected to one of said injectors and having relative motion with respect to said control element, a second injector controller connected to another of said injectors and having relative motion with respect to said control element, and means for simultaneously moving both of said injector controllers with respect to said control element in accordance with a predetermined variation in load upon said engine.

ALLAN M. STARR.

REFERENCES CITED

The following references are of record in the file of this patent:

UNITED STATES PATENTS

| Number | Name | Date |
|---|---|---|
| 1,967,101 | Rossbach et al. | July 17, 1934 |
| 2,166,968 | Rohlin | July 25, 1939 |
| 2,186,043 | Rohlin | Jan. 9, 1940 |
| 2,250,814 | Rohlin | July 29, 1941 |
| 1,737,602 | Mohler | Dec. 3, 1929 |